United States Patent [19]
Ablett

[11] 3,849,793
[45] Nov. 19, 1974

[54] IMAGE ANALYSIS SYSTEM

[75] Inventor: Roger John Herbert Ablett, Potton, England

[73] Assignee: Image Analysing Computers Limited, Milbourn, Royston, Hertfordshire, England

[22] Filed: Dec. 27, 1972

[21] Appl. No.: 318,713

[30] Foreign Application Priority Data
Dec. 31, 1971 Great Britain .................... 61036/71

[52] U.S. Cl. .......... 358/81, 178/DIG. 36, 340/324 R
[51] Int. Cl. .............................................. H04n 9/00
[58] Field of Search ........... 178/5.2 R, 5.4 R, 6, 6.8, 178/DIG. 36

[56] References Cited
UNITED STATES PATENTS

| | | | |
|---|---|---|---|
| 2,982,814 | 5/1961 | Fine et al. | 178/6.8 |
| 3,214,515 | 10/1965 | Eberline | 178/6.8 |
| 3,549,887 | 12/1970 | Hansen | 250/71.5 |
| 3,551,589 | 12/1970 | Moskovitz | 178/5.4 R |
| 3,603,962 | 9/1971 | Lechner | 340/324 A |
| 3,644,667 | 2/1972 | Shimotsuma | 178/6.8 |

*Primary Examiner*—Robert L. Richardson
*Attorney, Agent, or Firm*—Oblon, Fisher, Spivak, McClelland & Maier

[57] ABSTRACT

An image analysis system in which the conventional monochrome television monitor is replaced by a colour television monitor. The video signal relating to the field under analysis is arranged to produce a monochrome display in the colour monitor but signals obtained from processing the video signal are arranged to produce distinctive colours in the monochrome display. Circuits are described by which the detected signal pulses obtained by threshold detection of the video signal, detected signal pulses of amended duration (both increased and decreased duration), count pulses and shape classifying pulses may be arranged to produce different colours in the display.

Where alpha-numeric characters are included in the television display to indicate a numerical value of e.g. the number of features detected and counted, circuits are described for producing the alpha-numeric characters in the same colour as the parameter to which they relate, is displayed.

18 Claims, 2 Drawing Figures

IMAGE ANALYSIS SYSTEM

Figure 1:
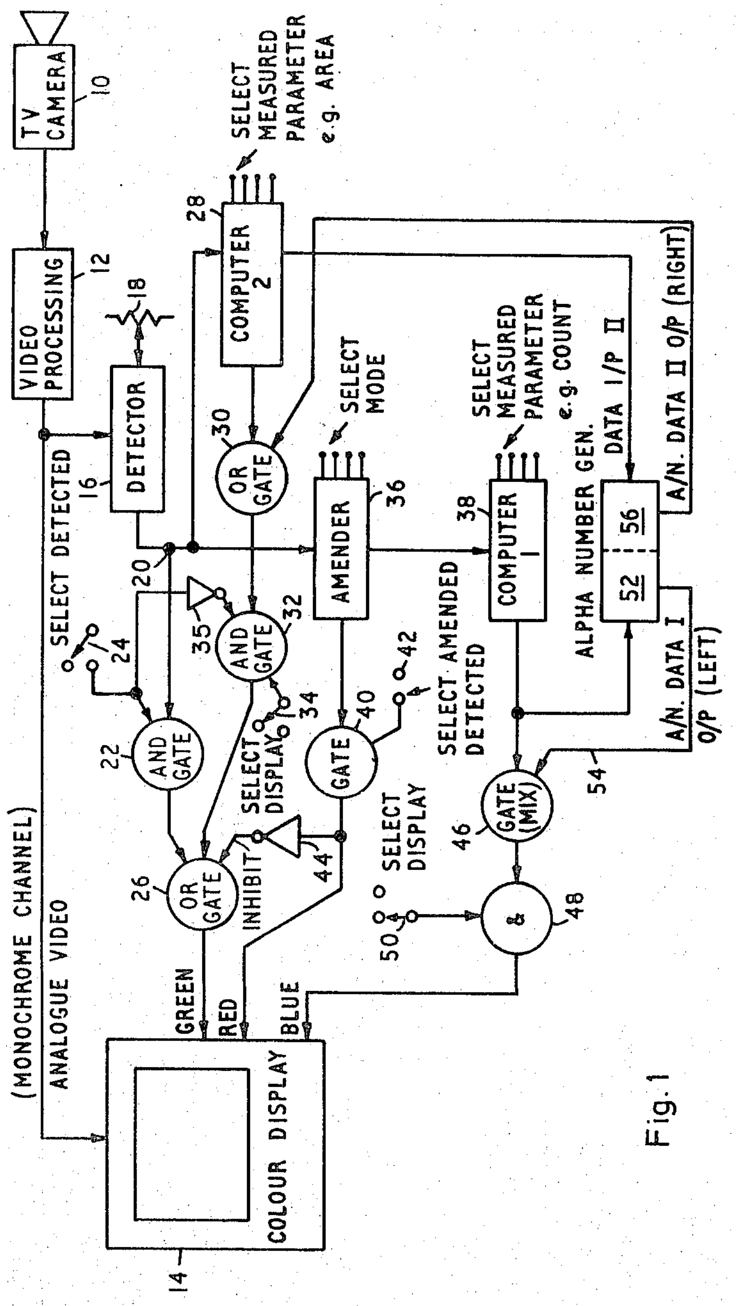

The present invention relates to image analysis systems and in particular to methods and apparatus for producing an improved visual display of the field/features under analysis and related information. By image analysis system we mean apparatus by which a field containing features to be analysed in scanned to produce a video signal, the video signal amplitude excursions are compared with a reference voltage to detect those above (or below) the reference voltage level and constant amplitude pulses are generated from the detected excursions to form so-called detected signal pulses and measurements are made on the detected signal pulses or signals derived therefrom.

Conventionally an image analysis system is a monochrome system in which different transmission densities colours or reflectivities etc. in the field are displayed as a series of grey levels intermediate white and black.

The detected signal is usually in the form of a two value signal i.e. it has a one value when the detection criterion is satisfied and another (typically zero) value when the criterion is not satisfied. In known systems the one value is arranged to correspond to white (or black) depending on the nature of the field under analysis and the displayed image on the monitor, so as to contrast sharply with the immediate surroundings in the field. By displaying the detected signal superimposed on the video signal the detected regions of the field are immediately obvious from the monitor display and British Patent Specification No. 1,127,742 describes and claims a method of accurately adjusting the reference voltage level.

However the arrangement is not ideal when the features in a field comprise for example apparently black features on an apparently white background or vice versa. In that event it is almost impossible to produce a detected display which contrasts with both the background and the features so as to allow the detected regions to be readily distinguished from the undetected regions. Thus where the features are black and the surrounding background is white, a white or brightened detected "area" superimposed on the features will produce a virtually all-white field.

It is an object of the present invention to provide a method and apparatus by which the displayed information can be more easily distinguished.

According to one aspect of the present invention in an image analysis system there are provided a colour television tube, control circuits therefor (known per se), means for supplying thereto the video signal to produce a monochrome representation of the field under analysis, circuit means for controlling the instantaneous colour produced by the television tube having an input terminal for receiving colour controlling signals and means for supplying to the input terminal the detected signal pulses or pulses derived therefrom whereby the detected signal pulses or signals derived therefrom produce a CRT display of a particular colour.

The invention thus provides a method of analysing features in a field using an image analysis system comprising the additional steps of supplying the video signal to a colour television display monitor in a manner to produce a monochrome representation of the field, supplying the detected signal pulses or pulses derived therefrom to a colour controlling circuit adapted to control the colour of the monitor display whereby the display of the detected signal pulses or pulses derived therefrom appear in a distinctive colour in the television display.

By pulses derived from the detected signal pulses is included a single count pulse generated for each detected feature and/or a shape classifying pulse generated from two or more parameter value signals computed for each detected feature.

Various functions can be performed on the original video signal or more usually the detected video signal to obtain further signals which yield yet more information about the image under analysis. For example it is possible to add and subtract electrical pulses from the detected signal pulses and thereby amend the detected signal. If the amended detected signal is employed for producing the high-lighted display areas it is impossible to determine which parts of the areas relate to the original detected areas and which parts correspond to the amendments made to the detected signal pulses by way of addition or subtraction.

To overcome this deficiency it is proposed that the amending electrical pulses are employed to produce a different coloured display from that produced by the unamended detected signal pulses. Thus where the amendment has resulted in the detected signal pulses concealing a hole in the middle of a feature the hole will appear in the display at a different colour region within the detected display of the remainder of the area of the feature.

Amendment of the detected signal pulses can be made in many ways and the above example is not intended to be limiting.

Typically the detected signal pulses whether amended or otherwise are applied to a computer for deriving an electrical signal indicative of some parameter of the field or the features in the field such as area, number, size, volume, proximity etc., and the value for the parameter is available either at the end of scanning each feature or at the end of scanning the field or both depending on the particular type of computer and parameter which is being measured. A preferred type of computer is that described in our British Patent Specification Nos. 1,264,804, 1,264,805 and 1,264,807 and in our U.S. Pat. No. 3,619,494. Where a large number of functions are being performed on a field of view it is not always easy to distinguish the display of one function from that of another and this is particularly the case where the signal indicating that a feature has been counter produces a small bright mark at the lower right hand corner of a feature. This point which is determined by the anti-coincidence detector described in our British Patent Specification No. 1,264,807 and in our U.S. Pat. No. 3,619,494, can sometimes be confused either with the background where the latter is made up of a large number of very small highlighted particles or regions or with an adjacent feature or even with the counted or measured feature itself.

It is proposed that this deficiency also be overcome by causing the signal normally producing the anti-coincidence point mark or flag to produce a different coloured mark on the screen, different that is from the detected display and/or also the remainder of the display on the screen. Thus marks indicating that particular features have been counted may for example be red whilst areas resulting from the displayed detected signal may be green.

Where for example a size distribution is performed the detected signal pulse from each feature in the field are supplied to the associated parameter computer of the type described in our British Patent Specification No. 1,264,805 and in our U.S. Pat. No. 3,619,494 and the signal indicating the measured value of the size of each feature is available at the anti-coincidence point for each feature. The signals representing the parameter values may be classified during the single frame scan and accumulated in a number of different registers so that for example the numbers of features falling within different ranges can be obtained as a direct read out at the end of a single scan. It is not however possible to readily decide which features have been classified into which of the size ranges particularly where the parameter under consideration is area or perimeter neither of which are readily assessed visually.

To overcome this deficiency it is proposed that either the count marks at the anti-coincidence points for the features or the detected displays of the differently sized features produce differing colours depending on the range into which the parameter measurement for the feature falls.

In a further development the individual features in a field can be classified according to shape or a mathematically derived factor produced by a ratio of for example "area to perimeter" or "area to longest dimension" etc. etc. Where different features have been classified in this way it is sometimes convenient to display which features have been classified as having one characteristic of shape and those which have been classified as having yet another shape characteristic. This is particularly the case where a methematical formula is employed for determing a shape factor for a feature since in this way it is possible to check the accuracy with which a chosen formula distinguishes between different shapes. Whereas it is possible to cause the individually selected types of feature to be displayed separately or highlighted on a monochrome system it is not possible to readily indicate which of a number of displayed features have been classified as having a particular shape factor and others which have been classified as having a different shape factor.

To overcome this deficiency it is proposed that either the count pulses or the detected video signals or some other signal associated with selected features (selected according to shape or some other consideration) produce differently coloured displays in the monitor so that the differently classified features are readily and simultaneously discernable.

According to a further preferred feature of the invention where the display includes a series of horizontal and vertical lines in the form of a grid thereby to allow measurement or registration of features in a field under analysis, the signals producing the grid lines are also supplied on colour control signals so as to produce lines of a different colour from any other that is used in the display for ease of distinguishing them from the remainder of the display.

When measurements are made on the detected signal so as to determine e.g. the size of the detected regions of the field and typically their area, the measured values may be displayed as an alpha numeric display in a selected region of the monitor display as well as inserting the digital value of the measured parameter into a store or register. Where two or more parameters are measured and displayed simultaneously and two or more alpha numeric displays are produced on a television monitor screen it is not always readily apparent as to which of the particular parameters the different alpha numeric displays relate.

According therefore to a further preferred feature of the invention the alpha-numeric display relating to a particular measured parameter is displayed in a characteristic colour. Preferably the colour of the alpha-numeric display is chosen to be the same as that in which the related parts of the CRT picture (e.g. detected areas, count pulses etc.) are displayed.

Figure 2:
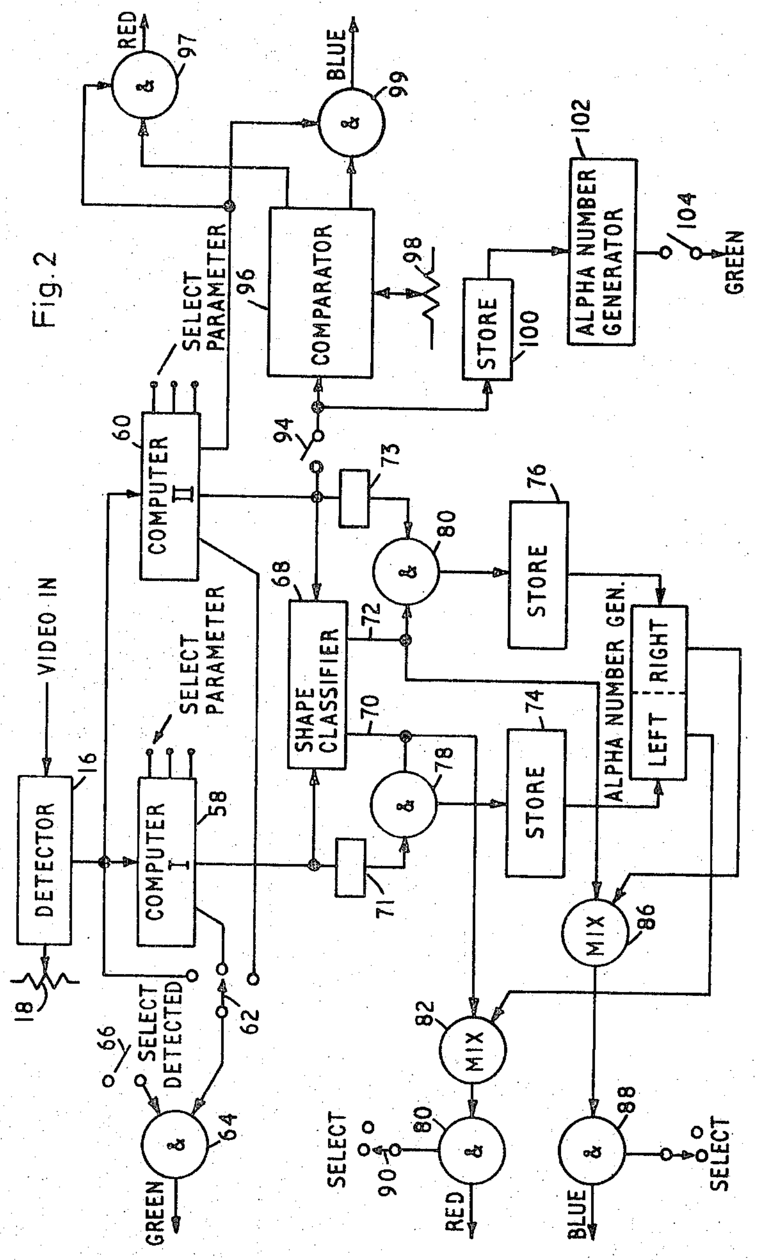

The invention will now be described by way of example with reference to the accompanying drawings in which:

FIG. 1 is a block circuit diagram of an image analysis system embodying the invention for displaying different signals obtained from the analysis on a colour display monitor, and FIG. 2 is a block circuit diagram of part of an image analysis system by which the shapes of individual features can be determined and classified and information indicating particular shapes is displayed on a colour display monitor of the type shown in FIG. 1 in different colours.

In FIG. 1 a video signal from a television camera 10 is processed by a video processing stage 12 in known manner to remove for example shading, and the processed video signal is applied as an analogue video signal (monochrome) to a colour display monitor 14 and also to an input of a detector 16 to which is supplied a reference voltage from a potentiometer 18 with which the instantaneous amplitude level of the video signal is compared. In known manner the detector 16 detects amplitude levels which bear a certain relation to the reference voltage level and binary pulses are generated corresponding to the duration of video signal amplitude levels which satisfy the detection criterion. These appear at the junction 20 and are applied inter alia to an AND-gate 22.

When the switch 24 is operated so as to apply an appropriate voltage to another input of the AND-gate 22, the detected binary pulses from junction 20 are transmitted via AND-gate 22 through an OR-gate 26 to appear as control signals for the green colour control signal input on the monitor 14. Thus in the event that a detected signal pulse appears in the output of gate 26, the monitor is arranged to produce a green display for the duration of the signal pulse. Thus the detected areas in the original field viewed by the television camera 10 will appear green in the colour display monitor 14. Those parts of the original field for which the video signal amplitude levels are not detected, will appear as a monochrome picture.

The detected signal pulses from junction 20 are applied to a computer 28 of the type described in our British Patent Specifications Nos. 1,264,804, 1,264,805 and 1,264,807 and in our U.S. Pat. No. 3,619,494. The electrical pulses available within the computer 28 may to advantage be monited and to this end are applied to an OR-gate 30 the output of which provides one input to an AND-gate 32. A second input of gate 32 is provided with an appropriate voltage to cause the gate 32 to conduct when switch 34 is closed and a third input to AND-gate 32 is supplied via an inverting amplifier 35 from the gate 24. The action of the inverting amplifier 35 and the connection to the gate 24 is to inhibit the AND-gate 32 in the event that the switch 24 has been operated so as to select for display the detected signal pulses from the detector 16. However when the switch 24 is opened so as not to select the detected signal pulses for display, AND-gate 32 is enabled by the action of inverting amplifier 35, when its own selector switch 34 is closed. Pulses transmitted via gate 32 are transmitted via the OR-gate 26 to the green input terminal of the monitor 14. In this way either the detector output or the pulses within the computer 28 may be displayed as a green display in the monitor 14.

The detector signal pulses from junction 20 are also supplied as an input signal to an amender circuit 36 which is conveniently of the type supplied by the applicant company for use in the QUANTIMET 720 Image Analysing Computer and described in technical data sheet 7222 produced by Image Analysing Computers Limited. The amended detected signal pulses from the amender 36 are supplied to a computer 38 to be described hereinafter and also to one input of an AND-gate 40 whose other input is supplied with an enabling signal from a switch 42 when the latter is closed. Amended pulses which are transmitted via gate 40 appear as input pulses to the red input terminal of monitor 14 so that the amended detected signal pulses will be displayed as red. An inverting amplifier 44 connected between the output of gate 40 and an inhibit input on OR-gate 26 prevents the simultaneous display of green and red by the monitor 14 in the event that the detected signal pulses or computer pulses have been selected by switches 24 or 34 respectively.

It will be appreciated that the output signals from the amender 36 which are supplied to gate 40 may alternatively be the signal pulses which are added to or subtracted from the detected signal pulses by the amender circuit 36. In this way, for example, a hole which appears in a feature which has been detected and, which by the action of the amender 36, has been "filled", will appear red whilst the surrounding feature will appear green.

Computer 38 is for example set to count those features in the field which produce amplitude levels which are detected by detector 16 and thus conveniently comprises a counter and computer such as is described in the aforementioned British Patent Specifications and in aforementioned U.S. Pat. No. 3,619,494, and also in technical data sheets 7223/1 produced by Image Analyzing Computers Limited. The output from computer 38 comprises a series of count pulses which appear at the bottom right hand corners of the detected features in a display of the detected features and count pulses. These pulses are supplied via an OR-gate 46 to one input of an AND-gate 48 the other input of which is supplied with an enabling voltage by a switch 50 when the latter is operated into the appropriate position. At that time the count pulses transmitted via gate 48 are applied to the blue input terminal of the monitor 14 so that the anti-coincidence points of the detected features will be marked by a small blue flash in the monitor display.

As is known from the QUANTIMET 720 Image Analysing Computer, the information from a computer such as 28 or 38 may be displayed as an alpha numeric display on the television display monitor such as 14. Conveniently the colour of the alpha numeric display relating to the computed value from the computer 38 (which is supplied with signals from the amender 36) appears in the same colour as that of the count pulses i.e. blue. To this end the output from computer 38 is supplied to one input of a conventional alpha-numeric character generator or alpha number generator 52 the output of which comprises the pulses which when displayed produce the alpha numeric display equivalent to the total number of count pulses released during a single frame scan. Alpha number generators of the type illustrated at 52 are well known and commercially available. Exemplary devices usable with the apparatus of the present invention are disclosed in British Patent Specifications Nos. 1,142,084 and No. 1,157,237. These alpha-numeric display-producing pulses are supplied via line 54 to the second input of OR-gate 46 and since these appear at the blue input terminal to the monitor 14, these will produce a blue alpha-numeric display.

Likewise the alpha numeric display produced for the total area computed by computer 28 is also displayed in the same colour as the pulses monitored from computer 28 (i.e. green). To this end the output signals from computer 28 are supplied to an input of another conventional alpha-numeric character generator 56, which may be identical to alpha-numeric character generator 54 described previously, the output pulses of which are supplied to a second input of OR-gate 30. Since the output pulses from OR-gate 30 can be applied as green control signals to the monitor 14, the latter will produce a green display of the alpha numeric value of the total area computer by computer 28 during a single frame scan.

In known manner of course the alpha numeric displays may be an average of the number of features counted and the total area measured during each of a number of consecutive frame scans.

FIG. 2 illustrates an alternative arrangement in which the processed video signal is applied to a detector 16 having supplied thereto as previously described a reference voltage from a potentiometer 18 to provide detected signal pulses at the input of each of two computers 58 and 60. The computers 58 and 60 are conventional devices which are similar to the computers 28 and 38 described previously. The computers 58 and 60 are identical to one another, although one is arranged to compute a different parameter than the other from the same information. The conventional computers 58 and 60, which may be described as function computers, are described in detail in technical data sheet 7223/2 produced by Image Analyzing Computers, Limited. The function computers 58 and 60 are operable in conjunction with a standard computer such as the MS 3 computer described in technical data sheet 7223/1 and as further described in U.S. Pat. No. 3,624,604. Computer 58 is selected to compute from the detected signal pulses applied thereto for example the area of each detected feature whilst computer 60 is selected to compute for example the perimeter of each detected feature. The detected signal pulses from detector 16 and the outputs from computer 58 and 60 are supplied to the three terminals of a three way switch 62 whereby each may be selected in turn and supplied via an AND-gate 64 as green control signals to the green input of monitor 14 in FIG. 1. An enabling signal for an AND-gate 64 is provided in a manner as previously described via switch 66.

As described in the complete specification of our co-pending British Patent Application 53403/69, and in equivalent U.S. Pat. No. 3,624,604, the two computed values of area and perimeter (for example) for each detected feature can be made available simultaneously during the frame scan from computers 58 and 60 and can be compared in a circuit refered to as a shape classifier 68. The shape classifier 68, which may perhaps be more aptly described as a form separator, is a conventional device described in technical data sheet 7223/3 produced by Image Analyzing Computers, Limited. This conventional shape classifier or form separator 68 is also described in general terms in U.S. Pat. No. 3,624,604, mentioned above. The shape classifier 68 may include additional signal processing and delaying circuits for example to perform a mathematical function on one or both of the computed results but in essence is a comparator which generates an output signal on line 70 if the two computed parameter values for a feature satisfy one criterion and produces an output signal on line 72 if they satisfy a second different criterion. By appropriate choice of parameter and comparison criterion, so an indication as to the shape of the detected feature can be obtained — hence the name shape classifier for circuit element 68.

The shape classifying information on line 70 or 72 is made available simultaneously with the computed values from computers 58 and 60 and consequently can be gated to a store 74 or 76 depending on whether the information from the shape classifier appears on line 70 or 72 respectively. This is achieved by the action of AND-gates 78 and 80 respectively. Trimming delays 71, 73 may be required.

Shape classifying signals on line 70 may for example indicate features which are generally circular in outline whilst information on line 72 may indicate for example features which are generally elongate in shape. The information will appear as a single pulse at the anti coincidence point of the feature concerned and this can be supplied via an OR-gate 82 and a selector gate 84 to the red input terminal of display monitor 14 (in the case of information signals appearing on line 70) and alternatively via OR-gate 86 and AND-gate 88 to the blue input terminal on the display monitor 14. An enabling signal for selector gates 84 and 88 is available by appropriate setting of switches 90 and 92 respectively.

The number of features which have been classified by an information signal of line 70 will be proportional to the magnitude of the signal stored in store 74 at the end of a frame scan. Likewise the number of features which have been classified by an information signal along line 72 will be proportional to the magnitude of the signal in store 76. These can be converted at the end of one or a plurality of frame scans to produce an alpha numeric display of the number of features of each type which have been counted during an analysis and displayed in known manner on the display monitor 14. Conveniently the one alpha numeric display appears on the left of the screem and the other on the right. As described with reference to FIG. 1, the pulses producing the alpha numerals are supplied via OR-gates 82 and 86 so that the alpha numeral producing pulses are applied to the red and blue input terminals of the display monitor respectively. Thus the number of features which have been classified by a red shape classifying mark in the display will be denoted by the red alpha numeric display and likewise the number of features which have been classified by a blue mark will be denoted by the blue alpha numeric display.

A further circuit is shown in FIG. 2 connected to the output of computer 60. When switch 94 is closed the signals from computer 60 are supplied to a comparator 96 in which they are compared with a reference signal obtained for example from a potentiometer 98. The comparator 96 generates one of two output signals (depending on the value of the computer output signal) which is gated with the anti-coincidence count pulse from the computer 60 by one of AND-gates 97, 99 for supplying a control pulse to the Blue or Red colour control input in the monitor 14 (in place of an output from one of AND-gates 84, 88).

A further refinement is provided by means of a store 100 and further alpha numeral generator 102. The output signals from computer 60 are supplied to the store 100 when switch 94 is closed and at the end of a frame scan the store will hold a signal proportional to the total numerical value of the measured parameter for all the detected features. This can be used to generate an appropriate series of pulses to produce an alpha numeric display on the monitor 14, using the alpha numeral generator 102. Since the alpha-numeric display relates to the parameter measured by computer 60, a green alpha-numeric display is generated when switch 104 is closed, by supplying the pulses from the generator 102 to the green colour control input —if necessary via a further input (not shown) an OR-gate 64.

Although not shown in FIG. 1 the inverting amplifier 44 may be disconnected and the pulses from the detector 16 employed as inhibit signals for gate 40. In this way the detected signal pulses (from detector 16) take precedence over the pulses from amender circuit 36. In this way the detected signal pulses from a feature would be fully displayed in green and the pulse extension or in-fill where the feature is re-entrant or contrains a "hole", produced by the amender action, would appear red.

A switch 37 for the amender 36 enables various amending actions to be performed on the detected signal pulses. In one switch position, no amending occurs and the detected signal pulses can pass direct to the computer 38.

I claim:

1. In a method of analyzing features in a field comprising the steps of scanning the field to produce a monochrome video signal relating thereto, detecting amplitude levels thereof which exceed a given reference voltage, generating constant amplitude pulses from the detected amplitude levels and deriving signals from the constant amplitude pulses, the improvement comprising the additional steps of:

displaying said monochrome signal on a colour television display monitor to produce a monochrome representation of the field, and, displaying at least some of said signals derived from said constant amplitude pulses on said monitor in a distinctive colour simultaneously with said monochrome video signal whereby the display of these signals is in strong contrast to the monochrome representation of the remainder of the field.

2. A method as in claim 1, wherein said improvement further comprises the step of:

generating shape classifying pulses from at least two parameter values signals computed from said constant amplitude pulses arising from scanning detected features.

3. A method as in claim 1, wherein said improvement further comprises the steps of:

adding to said constant amplitude pulses other electrical pulses to amend the duration of said constant amplitude pulses; and supplying said amended pulses to said colour television display monitor.

4. A method as in claim 1, wherein said improvement further comprises the steps of:

subtracting from said constant amplitude pulses other electrical pulses to amend the duration of said constant amplitude pulses; and, supplying said amended pulses to said colour television display monitor.

5. A method as in claim 1, wherein said improvement further comprises the steps of:

adding to said constant amplitude pulses other electrical pulses to amend the durations of said constant amplitude pulses, combining said amended pulses and the original constant amplitude pulses to produce further electrical pulses, the durations of which correspond to the differences in duration between the amended pulses and the original constant amplitude pulses;

supplying said further electrical pulses to a second colour controlling circuit; and, producing a colour different from said distinctive colour on said monitor with said further electrical pulses.

6. A method as in claim 1, wherein said improvement further comprises the steps of:

subtracting from said constant amplitude pulses other electrical pulses to amend the durations of said constant amplitude pulses, combining said amended pulses and the original constant amplitude pulses to produce further electrical pulses, the duration of which correspond to the differences in duration between the amended pulses and the original constant amplitude pulses;

supplying said further electrical pulses to a second colour controlling circuit; and, producing a colour different from said distinctive colour on said monitor with said further electrical pulses.

7. A method as in claim 1, wherein said improvement further comprises the steps of:

deriving a count pulse for each detected feature from said constant amplitude pulses obtained from scanning each said feature, supplying said count pulses to a second colour controlling circuit; and, producing on said monitor a colour different from said distinctive colour for the duration of each of said count pulses.

8. A method as in claim 7, wherein said improvement further comprises the step of:

supplying both said constant amplitude pulses and said count pulses to said monitor; and producing respective distinct colours on said monitor superimposed on a monochrome video display in response to said step of supplying.

9. A method as in claim 1, wherein said improvement further comprises the step of:

producing single count pulses for each of said features detected in said field.

10. A method as in claim 9, wherein said improvement further comprises the steps of:

supplying said constant amplitude pulses to a computer whereby a first signal is derived which is proportional to a parameter of each feature, releasing said first signal simultaneously with the production of said count pulse corresponding to a particular feature, comparing the value of said first signal after its release with a reference signal, generating a second electrical signal if said first signal exceeds said reference and generating a third signal if said first signal is less than said reference; and, supplying said count pulse for each feature to one of two colour control circuits coupled to said monitor, whereby the display of count pulses for features whose parameter measurement exceeds said reference is a different colour from the display of count pulses for features whose parameter measurement is less than said reference.

11. A method as in claim 9, wherein said improvement further comprises the steps of:

deriving from said constant amplitude pulses obtained by scanning each feature a first electrical signal whose value is proportional to a geometric parameter of said feature, releasing said first electrical signal simultaneously with the production of said count pulse corresponding to a particular feature, summing said first signals derived from all detected features in said field, generating a total parameter signal whose value is proportional to the sum of all of the individual geometric parameter values for the features of said field; and, generating from said total signal electrical pulses which produce alpha numeric characters on said monitor indicating the numerical value of said total signal for said field.

12. A method as in claim 11, wherein said improvement further comprises the steps of:

producing alpha-numeric characters of the same colour as the display of said count pulses for features whose parameter signals have been accumulated to produce said alpha numeric characters.

13. In an apparatus for analysing features in a field including means for scanning said field to produce a monochrome video signal relating thereto, means for providing a reference voltage, means for detecting amplitude levels of said monochrome video signal which exceed said reference voltage, means for generating constant amplitude pulses in response to the output of said amplitude detecting means and means for deriving signals from said constant amplitude pulses, the improvement comprising:

a colour television tube and control circuit therefor, means for supplying to said colour television tube a video signal to produce a monochrome representation of said field under analysis, first circuit means for controlling the instantaneous colour produced by said television tube, said first circuit means having an input for receiving colour controlling signals; and, means for supplying to said input pulses derived from said constant amplitude pulses, whereby the pulses derived from said constant amplitude pulses produce a visual display of a particular colour.

14. Apparatus as set forth in claim 13 further comprising:

circuit means responsive to said constant amplitude pulses for producing for each detected feature in said field a single count pulse after the last line scan intersection with each feature, further colour controlling circuit means having an input terminal to which said count pulses are supplied, said further colour controlling circuit means producing a different colour visual display from said first circuit means, whereby a different colour is produced in said display for the duration of each count pulse from that produced during the detected signal pulses.

15. Apparatus as set forth in claim 14 further comprising:

computing circuit means responsive to said constant amplitude pulses for generating an electrical signal from said constant amplitude pulses obtained from scanning each feature whose value is proportional to a geometric parameter of said features; and, means for releasing each said electrical signal simultaneously with said count pulse for a particular feature.

16. Apparatus as set forth in claim 15 further comprising:

second computing circuit means also responsive to said constant amplitude pulses for generating a second electrical signal proportional to another geometric parameter of each detected feature; and, means for releasing each second electrical signal simultaneously with said count pulse and first electrical parameter signal for each feature.

17. Apparatus as set forth in claim 16 further comprising:

circuit means responsive to said first and second electrical signals derived from said constant amplitude pulses relating to each feature for producing a third electrical signal for each feature whose value is governed by the ratio of the value of the first electrical signal to the value of the second electrical signal for the feature; and, further circuit means for controlling the colour of said display of said count pulse for each feature in dependence on the value of said third electrical signal.

18. Apparatus as set forth in claim 15 further comprising:

circuit means for modifying a colour produced during each count pulse depending on the value of said geometric parameter computed for the particular feature.

* * * * *